United States Patent [19]

Dike

[11] Patent Number: 5,404,540
[45] Date of Patent: Apr. 4, 1995

[54] ARBITER WITH A UNIFORMLY PARTITIONED ARCHITECTURE

[75] Inventor: Charles E. Dike, Pleasant Grove, Utah

[73] Assignee: North America Philips Corporation, New York, N.Y.

[21] Appl. No.: 107,414

[22] Filed: Aug. 16, 1993

Related U.S. Application Data

[63] Continuation of Ser. No. 804,262, Dec. 4, 1991, abandoned.

[51] Int. Cl.⁶ .............................................. G06F 13/00
[52] U.S. Cl. ..................................... 395/725; 395/325; 395/275; 364/DIG. 1; 364/242.6; 364/242.7; 364/242.8
[58] Field of Search ............... 395/725, 325, 275, 775, 395/425; 370/85.2

[56] References Cited

U.S. PATENT DOCUMENTS

| | | | |
|---|---|---|---|
| 3,964,054 | 6/1976 | Annunziata et al. | 395/725 |
| 4,035,780 | 7/1977 | Kristick et al. | 395/725 |
| 4,275,458 | 6/1981 | Khara | 395/725 |
| 4,395,753 | 7/1983 | Comfort et al. | 364/200 |
| 4,404,630 | 9/1983 | Belforte et al. | 395/775 |
| 4,511,959 | 4/1985 | Nicolas et al. | 395/425 |
| 4,627,018 | 12/1986 | Trost et al. | 395/425 |
| 4,633,394 | 12/1986 | Georgious et al. | 395/650 |
| 4,649,475 | 3/1987 | Schenneman | 395/425 |
| 4,809,164 | 2/1989 | Fuller | 395/275 |
| 4,835,422 | 5/1989 | Dike et al. | 307/518 |
| 4,835,672 | 5/1989 | Zenk et al. | 395/425 |
| 4,897,833 | 6/1990 | Kent et al. | 370/85.2 |
| 4,969,120 | 11/1990 | Azevedo et al. | 395/325 |
| 5,146,595 | 9/1992 | Fujiyama et al. | 395/725 |
| 5,280,591 | 1/1994 | Garcia et al. | 395/325 |

FOREIGN PATENT DOCUMENTS

| | | | |
|---|---|---|---|
| 0262608 | 4/1988 | European Pat. Off. | G06F 13/26 |
| 0593614 | 6/1984 | Japan | G06F 3/00 |
| 2186443 | 7/1990 | Japan | G06F 7/00 |

OTHER PUBLICATIONS

IBM Technical Disclosure Bulletin vol. 27, No. 10B, Mar. 1985, "Prom Programmable Bus Arbitrator" pp. 5978–5981.

Primary Examiner—Jack B. Harvey
Assistant Examiner—Ayaz R. Sheikh
Attorney, Agent, or Firm—Steven R. Biren

[57] ABSTRACT

A multiple-input arbiter first mutually correlates groups of input signals for identifying a particular group, which includes at least one input signal that is a candidate for gaining the overall priority. Thereupon the priority winner is determined in that particular group. Such a hierarchical processing lends itself to an architecture wherein the processing in groups is implemented by cascaded levels of uniform logic blocks. The decomposition in uniform logic blocks considerably simplifies the design of arbiters that process large numbers of input signals.

10 Claims, 2 Drawing Sheets

ARBITER WITH A UNIFORMLY PARTITIONED ARCHITECTURE

This is a continuation of application Ser. No. 07/804,262, filed Dec. 4, 1991, now abandoned.

FIELD OF THE INVENTION

This invention relates to an Arbiter for providing at an arbiter output a priority signal associated with a particular one of a plurality of input signals received at an arbiter input. The invention relates in particular to an asynchronous arbiter.

BACKGROUND ART

An arbiter is a well known interface circuit that controls a communication protocol on the basis of assigning priority to a particular input signal selected from a plurality of input signals in order to determine a processing sequence for the input signals. The priority assignment may be based on temporal aspects of the signals, e.g., the order of arrivals at the arbiter's inputs. Assigning a priority to the particular input signal is then to be understood as selecting the particular input signal on the basis of its temporal characteristics with respect to the temporal characteristics of the other input signals: e.g., the particular input signal is the first to have arrived and determines the further processing. Typically, arbiters are used for controlling the communication between transmitting stations and receiving stations interconnected via a bus system.

U.S. Pat. No. 4,835,422 issued to Dike et al. discusses an electronic arbiter circuit with an input section that provides relative priority signals upon receiving a plurality of input signals. Each respective relative priority signal specifies which one of a respective pair of input signals has gained priority over the other input signal. The relative priority signals associated with all pairs of input signals are supplied to a decode logic circuit. The decode logic circuit operates on the relative priority signals in order to furnish output signals specifying an absolute priority of a particular one of the input signals. That is, the output signals indicate which one of the input signals is considered to have gained priority over all other input signals.

In addition, the decode logic circuit takes care of priority conflicts that may occur at the level of the relative priority signals. A priority conflict is an event wherein, for example, three or more input signals arrive substantially simultaneously within the resolution of the electronics and the delay paths involved. Such an event gives rise to inconsistences. For example, the relative priority signals may indicate that the respective input signals at first, second and third input terminals respectively gained priority over the input signals at the second, third and first input terminals. Assuming that one of these input signals indeed was the first to arrive overall, such a cyclic relationship does not give an unambiguous absolute priority winner. The decode logic circuit is designed to resolve the conflict by selecting in a predetermined manner one of the input signals, which was involved in causing the conflict, as the absolute priority winner.

The design of the decode logic circuit for conventional arbiters rapidly becomes increasingly complicated when the number of input signals is raised. This is due, among other things, to the growing number of logic combinations of the input signals that should be taken into account when anticipating all priority conflicts possible.

OBJECT OF THE INVENTION

It is an object of the invention to provide an arbiter that has a simpler design than the known arbiters, and that therefore is simpler to fabricate. It is a further object to provide a general concept for the architecture of multiple-input arbiters.

SUMMARY OF THE INVENTION

The invention provides an arbiter with an input for receiving a plurality of input signals, and with an output for furnishing an output signal specifying a priority assigned to a particular one of the plurality of input signals.

The arbiter of the invention comprises first correlating means for mutually correlating groups of input signals to select a specific one of the groups. The specific group is the group that includes at least one specific input signal having priority over the input signals of the other groups. The arbiter further comprises second correlating means for mutually correlating the input signals of the specific group to select the particular one of the input signals. The particular input signal has priority over the other input signal or signals of the same specific group and, automatically, over the input signals of the other groups.

The arbiter in the invention first mutually correlates groups of input signals for identifying the particular group, which includes at least one input signal that is a candidate for gaining the overall priority. Thereupon, the priority winner is determined in that particular group. It is explained below that such a hierarchical architecture, wherein the decode logic circuitry is distributed, considerably simplifies the logic structure of the arbiter. The hierarchical architecture is preferably implemented with a plurality of uniform and simple decode logic blocks.

BRIEF DESCRIPTION OF THE DRAWING

The invention will be explained below by way of example and with reference to the accompanying drawing in which.

DETAILED DESCRIPTION

DEFINITIONS

Figure 1:
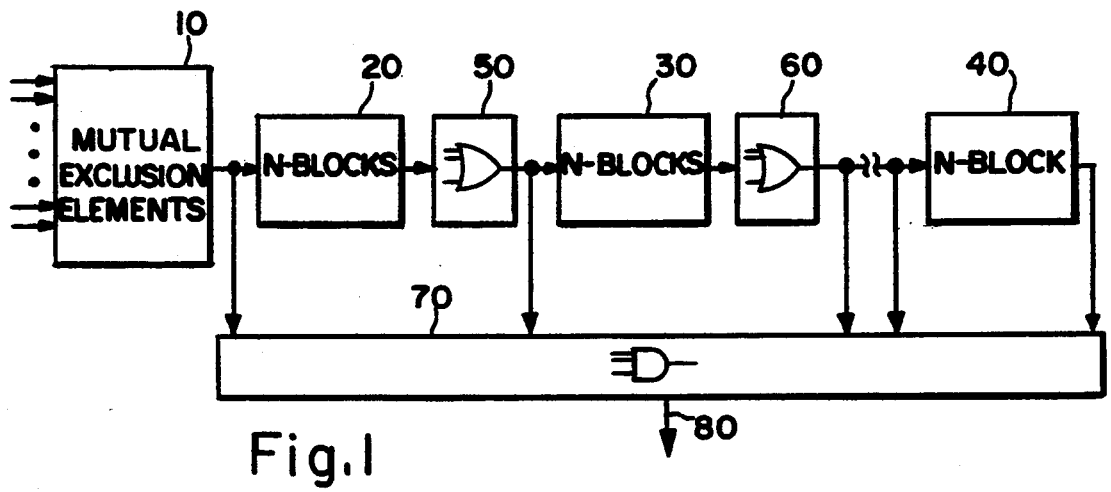
FIG. 1 shows a block diagram of an arbiter according to the invention.

The following notation is used in the explanation below. The indication "$S_p$" is shorthand for an input signal identified by subscript number "p". The expression "p/q" stands for: input signal $S_p$ has gained priority over input signal $S_q$. The representation "p/{k, l, m}" indicates the logic relationship: p/k AND p/l AND p/m. That is, $S_p$ has gained priority over $S_k$, $S_l$ and $S_m$. Similarly, "{p, q}/{k, l, m}" stands for: p/{k, l, m, q} OR q/{k, l, m, p}. That is, either $S_p$ has gained priority over $S_q$, $S_k$, $S_l$ and $S_m$, or $S_q$ has gained priority over $S_p$, $S_k$, $S_l$ and $S_m$.

An N-block is defined as a function that operates on signals: $\frac{1}{2}, \frac{1}{3}, \ldots, 1/N, 2/1, \frac{2}{3}, \ldots, 2/N, \ldots, (N-2)/(N-$ 1), (N-2)/N, (N-1)/N, and that supplies output signals: 1/{2, 3, ..., N}, 2/{1, 3, ..., N}, ..., N/{1, 2, ..., (N-1)}. In other words, an N-block is a function which operates on information that specifies the mutual relative priority in pairs of signals, and furnishes information regarding a unique priority winner among the signals. An implementation of an N-block is the basic building block for the decode circuitry in the arbiter of the invention.

The architecture of an arbiter according to the invention is based on a decomposition of the input signals by distributing the input signals over sub-sets of equal size with the size of the sets doubling (and therefore the number of sets being halved) at each successive level in the decomposition. At the intermediate decomposition levels, the priority relations on the sets are decoded in a way similar to the way wherein the priority relations on the input signals themselves are decoded at the first level. This hierarchical decomposition is explained below.

ANALYSIS

As an example, assume that among a set of sixteen input signals $S_1-S_{16}$ to be processed by a 16-input arbiter, the input signal $S_5$ is the overall priority winner. In accordance with above definitions, the expression:

i) 5/{1, 2, 3, 4, 6, 7, 8, 9, 10, 11, 12, 13, 14, 15, 16} is valid, and is equivalent to:

ii) {1, 2, 3, 4, 5, 6, 7, 8}/{9, 10, 11, 12, 13, 14, 15, 16} AND {5, 6, 7, 8}/{1, 2, 3, 4} AND {5, 6}/{7, 8} AND 5/6.

It is explained below how the terms in expression ii) are generated by starting out with the mutual priority signals of the form p/q. The mutual priority signals p/q are created by applying the input signals $S_1-S_N$ in pairs to mutual exclusion elements. A number of N input signals requires $N^2/2$ mutual exclusion elements. An example of such a mutual exclusion element for an electronic arbiter is described in U.S. Pat. No. 4,835,422 mentioned above. For the sake of brevity, only one of the signal paths is explored. The signal processing involved in the other signal paths is similar to the one reviewed below.

First of all, mutual priority signals are generated that subsequently are processed in groups by a 4-block in a first level of 4-blocks operating in parallel. For instance, tracing the mutual priority signals:

iii) 5/6; 6/5; 5/7; 7/5; 5/8; 8/5; 6/7; 7/6; 6/8; 8/6; 7/8 and 8/7, results in:

iv) 5/{6, 7, 8}; 6/{5, 7, 8}; 7/{5, 6, 8} and 8/{5, 6, 7}

For each 4-block, the associated results are supplied in pairs to two OR gates. For the results under iv) the following contributions are furnished at the outputs of the OR gates:

v) 5/{6, 7, 8} OR 6/{5, 7, 8}={5, 6}/{7, 8}, and
vi) 7/{5, 6, 8} OR 8/{5, 6, 7}={7, 8}/{5, 6}.

Among the output signals of the OR gates associated with the other 4-blocks of the first level, the following contributions are also provided that all have originated in a similar way:

vii) {7, 8}/{9, 10}; {9, 10}/{7, 8}; {5, 6}/{9, 10}; {9, 10}/{5, 6}; {7, 8}/{11, 12}; {11, 12}/{7, 8}; {5, 6}/{11, 12}; {11, 12}/{5, 6}; {9, 10}/{11, 12}; and {11, 12}/{9, 10}.

Together with {5, 6}/{7, 8} and {7, 8}/{5, 6}, the contributions under vii) are supplied to a further 4-block at a second level. The following four combinations appear at the further 4-block's output:

| viii) | {5, 6}/{7, 8, 9, 10, 11, 12} | {7, 8}/{5, 6, 9, 10, 11, 12} |
|---|---|---|
| | {9, 10}/{5, 6, 7, 8, 11, 12} | {11, 12}/{5, 6, 7, 8, 9, 10} |

Applying pairs of the combinations under viii) to a pair of OR gates gives the following entities:

ix) {5, 6}/{7, 8, 9, 10, 11, 12} OR {7, 8}/{5, 6, 9, 10, 11, 12}={5, 6, 7, 8}/{9, 10, 11, 12}, and x) {9, 10}/{5, 6, 7, 8, 11, 12} OR {11, 12}/{5, 6, 7, 8, 9, 10}={9, 10, 11, 12}/{5, 6, 7, 8}.

Likewise, other 4-blocks in the second level and the associated OR gates give rise to other entities:

| xi) | {1, 2, 3, 4}/{5, 6, 7, 8} | {5, 6, 7, 8}/{1, 2, 3, 4} |
|---|---|---|
| | {1, 2, 3, 4}/{9, 10, 11, 12} | {9, 10, 11, 12}/{1, 2, 3, 4} |
| | {1, 2, 3, 4}/{13, 14, 15, 16} | {13, 14, 15, 16}/{1, 2, 3, 4} |
| | {5, 6, 7, 8}/{13, 14, 15, 16} | {13, 14, 15, 16}/{5, 6, 7, 8} |

The twelve entities under ix), x) and xi) are supplied to a particular 4-block in a third level of parallel operating 4-blocks, thereby giving rise to the compositions:

xii) {1, 2, 3, 4}/{5, 6, 7, 8, 9, 10, 11, 12, 13, 14, 15, 16} {5, 6, 7, 8}/{1, 2, 3, 4, 9, 10, 11, 12, 13, 14, 15, 16} {9, 10, 11, 12}/{1, 2, 3, 4, 5, 6, 7, 8, 13, 14, 15, 16} {13, 14, 15, 16}/{1, 2, 3, 4, 5, 6, 7, 8, 9, 10, 11, 12}

In turn the compositions under xii) are combined in OR gates, resulting in the following compounds:

xiii)
{1, 2, 3, 4}/{5, 6, 7, 8, 9, 10, 11, 12, 13, 14, 15, 16} OR
 {5, 6, 7, 8}/{1, 2, 3, 4, 9, 10, 11, 12, 13, 14, 15, 16} =
  {1, 2, 3, 4, 5, 6, 7, 8}/{9, 10, 11, 12, 13, 14, 15, 16},
and
xiv)
{9, 10, 11, 12}/{1, 2, 3, 4, 5, 6, 7, 8, 13, 14, 15, 16} OR
 {13, 14, 15, 16}/{1, 2, 3, 4, 5, 6, 7, 8, 9, 10, 11, 12} =
  {9, 10, 11, 12, 13, 14, 15, 16}/{1, 2, 3, 4, 5, 6, 7, 8}.

At this point, referring to expressions v), xi) and xiii), it has been shown that all terms of expression ii) have been generated using successive levels of functionally uniform 4-blocks and OR gates. Combining the individual terms by means of logic AND gates eventually produces output signal i), indicating that input signal $S_5$ is the unique overall priority winner.

Note that the construction of the information items to be combined in order to select a unique overall priority winner can be simplified further. The last layer of OR gates used for creating the compounds under xiii) and xiv) is actually not necessary. It is readily seen that expression i):

i) 5/{1, 2, 3, 4, 6, 7, 8, 9, 10, 11, 12, 13, 14, 15, 16} is equivalent to:

xv) {5, 6, 7, 8}/{1, 2, 3, 4, 9, 10, 11, 12, 13, 14, 15, 16} AND {5, 6}/{7, 8} AND 5/6.

Note that the operation of a 4-block is uniform regardless of its position relative to other 4-blocks in the signal path. Accordingly, an arbiter in the invention is preferably implemented using functionally and even physically uniform N-blocks and uniform OR gates. Such an N-block preferably is optimized regarding speed or power consumption.

BLOCK DIAGRAM

FIG. 1 illustrates the general concept of the preferred embodiment of an arbiter in the invention. The block diagram of FIG. 1 shows the arbiter with a section 10 having a plurality of mutual exclusion elements and with a signal path comprising correlating units, such as units 20, 30 and 40, interconnected by means of layers of OR gates arranged in parallel, such as layer 50 and 60. The correlation units 20, 30 and 40 are distributed along the signal path and largely function as the decode logic block in the prior art mentioned above. Correlating units 20 and 30 each include a parallel arrangement of N-blocks (not shown), whereas correlating unit 40 has a single N-block (not shown). The input of each correlating unit 20, 30 or 40, and the output of correlating unit 40 are coupled to an arrangement of AND gates 70.

Operation of the arbiter is discussed by way of example with reference to the analysis above for the processing of sixteen input signals $S_1$–$S_{16}$. For this example, the N-blocks specified above are considered to be 4-blocks.

A number of one hundred and twenty-eight mutual exclusion elements 10 receive input signals $S_1$–$S_{16}$ and provide two-hundred-and-fifty six output signals of the form p/q as under iii) above. These output signals are supplied to both AND gate arrangement 70 and first correlating unit 20 that comprises twenty-eight 4-blocks (not shown) operating in parallel. A first one of these 4-blocks deals with input signal group 1-2-3-4, a second one with 1-2-5-6, a third one with 1-2-7-8, etc. First correlating unit 20 creates output results of the form p/{q, r, s}, plus permutations, as under iv). These results are transferred to an arrangement 50 of fifty-six 2-input OR gates operating in parallel in order to create contributions of the form {p, q}/{r, s} as under v)-vii) above.

The contributions obtained are supplied to an AND gate arrangement 70 and to second correlating unit 30 that comprises six 4-blocks operating in parallel in order to generate combinations of the form {p, q}/{r, s, t, u, v, w} as under viii). The combinations are then supplied to an OR gate arrangement 60 having twelve 2-input OR gates (not shown) arranged in parallel. OR gate arrangement 60 produces entities of the form {p, q, r, s}/{t, u, v, w} as under ix)-xi).

The entities are routed to AND gate arrangement 70 and to correlating unit 40 that comprises a single 4-block. Correlating unit 40 creates compositions of the form {p, q, r, s}/{a, b, c, d, e, f, g, h, i, j, k, l} as under xii). These compositions are supplied to AND gate arrangement 70.

AND gate arrangement 70 performs the logic calculations as under xv) in order to furnish output signals at output 80 that unambiguously specify the overall priority winner.

4-BLOCK

Figure 2:
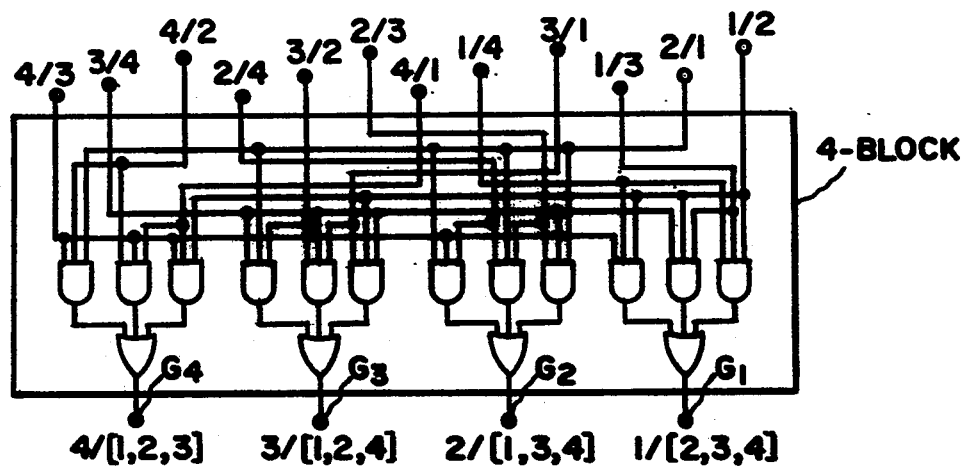
FIG. 2 shows an example of a basic decode logic block, defined below as a "4-block", for an arbiter of the invention.

FIG. 2 shows an example of a 4-block for use in the decode logic circuit of an arbiter in the invention. Such a 4-block is substantially known from FIG. 9 of U.S. Pat. No. 4,835,422, cited above and incorporated herein by reference. The 4-block is designed to embody an encoding pattern that activates one and only one of the outputs $G_1$, $G_2$, $G_3$ and $G_4$ at a time.

DETAILED 8-INPUT ARBITER

Figure 3:
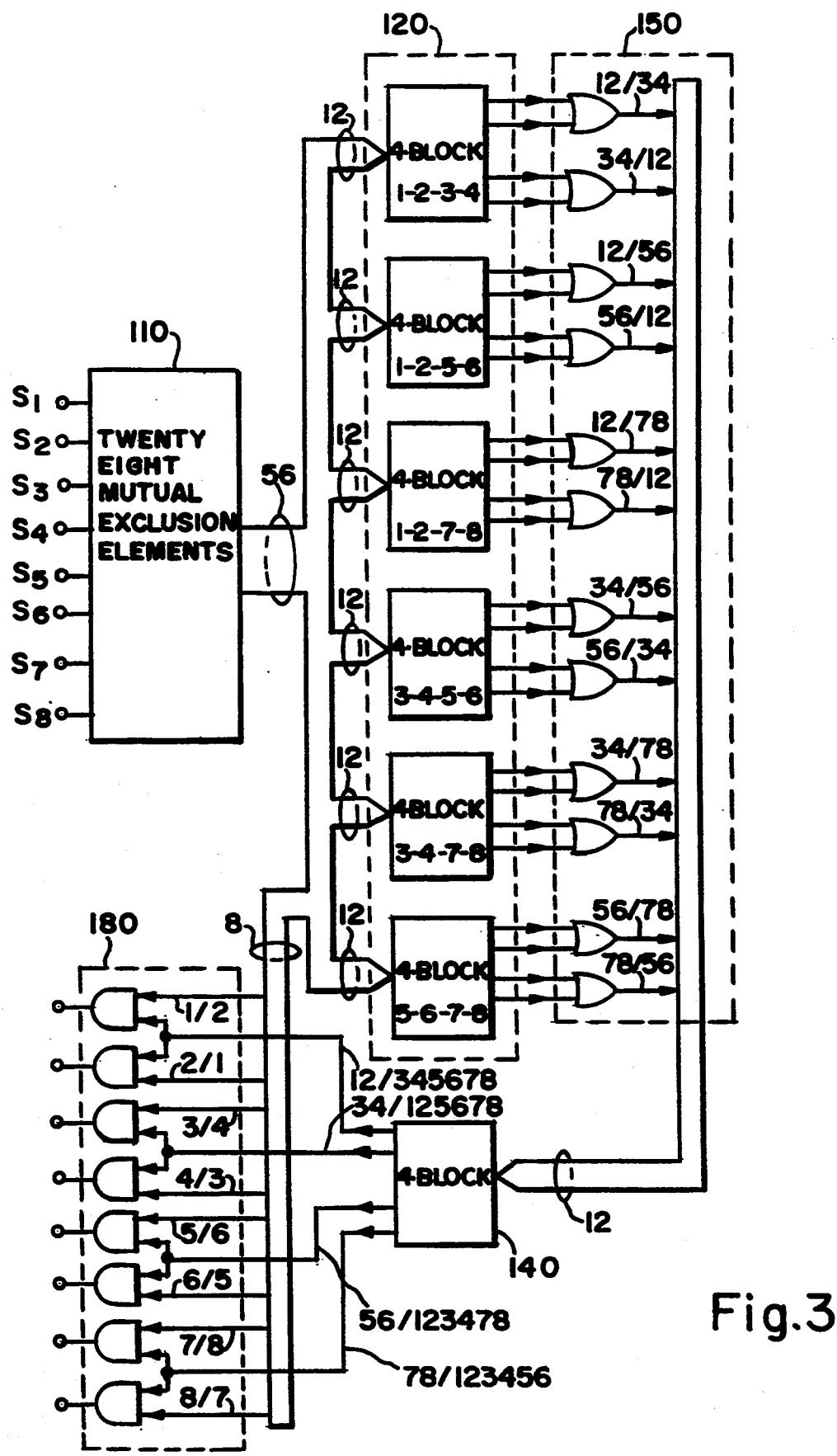
FIG. 3 shows a detailed example of an 8-input arbiter in accordance with the invention.

FIG. 3 shows an 8-input arbiter in accordance with the invention for the processing of input signals $S_1$–$S_8$. The arbiter comprises a set 110 of twenty-eight mutual exclusion elements for generating fifty-six mutual priority signals for all possible paired combinations of input signals having the form p/q and q/p (p and q have the values 1, 2, ..., 8 in this example). The mutual priority signals are supplied to a first correlating unit 120 and to an AND gate arrangement 180.

First correlating unit 120 comprises six 4-blocks arranged in parallel. Each respective 4-block processes the twelve mutual priority signals associated with a respective quadruplet of input signals, as is indicated in each 4-block. For instance, 4-block "1-2-7-8" handles the mutual priority signals corresponding to the quadruplet of input signals $S_1$, $S_2$, $S_7$ and $S_8$. The four output signals of each 4-block indicate which one of the input signals in the associated quadruplet is a relative priority winner within the collection. These output signals then are supplied to an arrangement 150 that comprises twelve 2-input OR gates, two per 4-block. Each OR gate creates a further output signal of the form {p, q}/{r, s}, as is indicated for each individual OR gate shown. The OR gates' twelve further output signals are supplied to a correlation unit 140.

Correlation unit 140 comprises a single 4-block for providing four output signals of the form {p, q}/{r, s, t, u, v, w} that are supplied to an AND gate arrangement 180.

AND gate arrangement 180 logically combines the output signals p/q of section 110 and the output signals {p, q}/{r, s, t, u, v, w} of correlating unit 140 in order to generate output signals $C_1$–$C_8$ that specify unambiguously the overall priority winner.

The example analyzed above relates to an arbiter for processing a number N of input signals that equals a power of 2. An arbiter in accordance with the invention for the processing of N input signals, N not being a power of 2, is created as follows.

First, consider an arbiter of the invention for handling N' input signals, N' being the smallest power of 2 that is larger than N. This arbiter has (N'—N) inputs that are never activated. These redundant inputs are represented by constants throughout the arbiter's network. That is, the network includes logic gates whose outputs do not change as a consequence of the redundant, stationary inputs.

Preferably, the network is pruned by removing these stationary logic gates from the network. In an IC embodiment, for instance, the pruning saves chip area and reduces power consumption. However, the inputs of the other, dynamic logic gates, which were connected to the outputs of the stationary logic gates, are to be provided with the appropriate logic constant. In an IC this is done by, e.g., tying the relevant gate input to a constant voltage. Alternatively, these specified dynamic logic gates are replaced by simpler logic gates that have less inputs and less components. This latter solution saves additional substrate area and reduces further power consumption.

Note that, instead of the OR gates and AND gates, NOR gates and NAND gates can be used, respectively, depending on the chosen polarity of the logic involved. The above diagrams therefore are to be interpreted functionally.

I claim:

1. An arbiter for arbitrating between a plurality of input signals comprising:

an input terminal for receiving the plurality of input signals;

an output terminal for outputting a priority output signal specifying priority for one of the plurality of input signals;

first correlating means for receiving the plurality of input signals, for generating groups of input signals and for comparing the groups of input signals to output a selected group of input signals having at least one input signal having priority over the input signals of all other groups;

second correlating means for receiving the input signals of the selected group and the plurality of input signals and for comparing the input signals of the selected group and the plurality of input signals to select a selected input signal from the selected group having a priority over the other input signals of the selected group and for thereupon supplying the priority output signal to the output terminal, thereby arbitrating between the plurality of input signals under the control of the input signals themselves.

2. The arbiter of claim 1 wherein the first correlating means comprises:

a first decode section connected to the input terminal for receiving the input signals to select in each respective group a respective special input signal having priority over all other input signals of the respective group, and for supplying respective first section output signals specifying the respective special input signal;

a second decode section coupled to the first decode section for receiving the first section output signals to supply second section output signals that specify the selected group upon comparing the first section output signals; and wherein the second correlating means comprises:

a third decode section connected to the first and second decode sections for receiving the first and second section output signals for selecting the particular input signal having priority over the other input signals of the specific group and for generating the priority output signal upon comparing the first and second section output signals.

3. The arbiter of claim 2 wherein the first decode section comprises mutual exclusion means for processing the input signals, each group being a pair, the first section output signals specifying for each respective pair the respective special input signal.

4. The arbiter of claim 3 wherein the second decode section comprises:

a plurality of respective first decode logic blocks for receiving a respective set of the first section output signals to generate respective first block output signals, each respective first block output signal being indicative of a single one of the input signals of the pairs associated with the respective set gaining priority over the other input signals of the pairs associated with the respective set;

a first arrangement of first logic gates having first gate inputs connected to the first decode blocks for logically combining the first block output signals, each respective first logic gate supplying at a first gate output a first gate output signal specifying which one of the pairs in the respective set includes the respective single one of the input signals;

a second decode logic block having inputs coupled to the first gate outputs for creating the second output signals in response to the first gate output signals; and wherein the third decode section comprises:

a second arrangement of second logic gates, each respective second logic gate receiving a respective one of the first section output signals and a respective one of the second signals.

5. The arbiter of claim 4 wherein a logic operation of each first logic gate includes an OR operation.

6. The arbiter of claim 4 wherein a logic operation of each second logic gate includes an AND operation.

7. The arbiter of claim 4 wherein the first and second decode logic blocks are uniform.

8. The arbiter of claim 7 wherein each of the first and second decode logic blocks comprises:

four parallel arrangements, each including three respective 3-input AND gates that have a respective AND output coupled to a respective input of a 3-input OR gate.

9. The arbiter of claim 7 wherein the first and second decode logic blocks each comprise at least part of an integrated circuit device.

10. The arbiter of claim 1 embodied in an integrated circuit device.

* * * * *